UNITED STATES PATENT OFFICE.

PORTER W. SHIMER, OF EASTON, PENNSYLVANIA.

CASE-HARDENING OF METALS.

1,279,457.

Specification of Letters Patent.   Patented Sept. 17, 1918.

No Drawing.   Application filed January 3, 1918.   Serial No. 210,176.

*To all whom it may concern:*

Be it known that I, PORTER W. SHIMER, a citizen of the United States, residing at Easton, in the county of Northampton, State of Pennsylvania, have invented certain new and useful Improvements in Case-Hardening of Metals, (Case A;) and I do hereby declare the following to be a full, clear, and exact description of the invention, such as will enable others skilled in the art to which it appertains to make and use the same.

This invention relates to the case-hardening of metals (for instance, articles of iron or steel), and particularly to those operations wherein the case-hardening of the articles is effected by their immersion for a suitable period of time in a liquid melt or bath of fused salts.

Heretofore, it has been a common practice to make use of alkaline cyanids (in conjunction with suitable alkaline chlorids and alkaline carbonates) in compounding the ingredients of the liquid melt. Serious disadvantages, however, are attendant upon the employment of such cyanids, not only because of their relatively high price and occasional scarcity, but also for the reason that they give off irritating gases in the workshop and are very poisonous.

The present invention, as will hereinafter more fully appear, is based upon the use, in an appropriate liquid melt, of calcium cyanamid, which is not poisonous and is readily obtainable at a moderate cost and is devoid of the objection of giving off irritating and dangerous gases. So also, the gases evolved burn at the surface of the melt and are non-poisonous and non-irritating to the mucous membranes.

Ordinarily, the attempt to introduce calcium cyanamid into a bath of fused salts, of the kind appropriate to case-hardening operations, is attended with a persistent froth or foam which keeps on mounting over the top of the pot, even when the pot is less than half full of the melt. This is due, in part, to the fact that, as found on the market in powdered form, calcium cyanamid has usually been exposed to more or less air-slaking. It is mainly due, however, to the energetic evolution of gases given off by reason of the chemical action of the melt upon every minute particle of the calcium cyanamid. The direct introduction of the powdered cyanamid into the melt is, therefore, impracticable. Accordingly, in the practice of the invention, suitable conditions must be observed, or procedure be devised, to overcome or minimize the frothing in order to render its use feasible.

Thus, I have ascertained that if calcium cyanamid is taken fresh from the furnace in which it is produced, and before it has been subjected to prolonged exposure to the slaking influence of the air, it may be introduced into a bath of fused salts suitable for the case-hardening operation, without difficulty, and particularly without danger of overflowing frothing of the bath.

I have obtained good results by employing as the liquid melt into which the calcium cyanamid is to be introduced, a fused mixture of sodium chlorid, calcium chlorid, and barium chlorid, in equal proportions by weight; or, I may substitute for said mixture a fused mixture of two parts by weight of sodium chlorid to one part by weight of calcium chlorid. Either of these mixtures is typical of others of a similar character that may be employed as the liquid melt into which the calcium cyanamid is to be introduced. For instance, alkaline carbonates may be employed in making up the liquid melt.

Furthermore, a melt can be made of potassium chlorid alone, or of a mixture of sodium chlorid and potassium chlorid in the proportion of their greatest fusibility. When potassium chlorid, (which, at present, is dear) again becomes cheap enough to be commercially available, this melt will have a number of important advantages. For instance, the melt has the case-hardening properties of the ordinary cyanid mixtures and whatever residual waste there may be has a fertilizer value by reason of the potash and nitrogen it contains.

The mixture of alkaline chlorids with chlorids of the alkaline earths, or of alkaline chlorids and alkaline carbonates, is brought to fusion in a suitable iron pot, and is maintained in the fused or melted condition during the case-hardening operation. I then introduce the calcium cyanamid into the liquid melt,— preferably, as above noted, fresh from the furnace in which it has been produced, or, at any rate, before it has been exposed materially to the slaking influence of exposure to the air. The introduction of the calcium cyanamid takes place to particular advantage if the fragments of fresh or carefully preserved calcium cyanamid (preferably in lumps from 1 to 2 inches in diameter) are placed in a basket of iron wire, said basket being suspended in the liquid melt at a location near the bottom of the pot and in such manner as not to interfere with the use of the bath for the carrying on of the case-hardening operation. The articles to be case-hardened are preferably suspended in the bath, as in the usual practice, upon suitable sustaining grids or the like, so as to be subjected to the best advantage to the action of the bath. During this operation, and whenever the bath is not in use, the case-hardening properties may be conserved by covering the pot with a well-fitting cover.

Ordinarily, some time is necessary for the action of the bath upon the cyanamid, in order to develop in the bath the case-hardening properties. This time will vary from a few minutes up to say one-half hour or more, according to the size of the bath. The ability of the bath to do case-hardening effectively is indicated by an active evolution of gas from the bath. As soon as the gas begins to be evolved, the articles to be treated may be suspended in the bath, according to the usual practice, and for the period of time desired.

I have found that it is not necessary to leave the basket containing the cyanamid continuously in the bath, but that after the removal of the basket and its contents, the bath retains its case-hardening properties for a considerable time. A weakening of its efficiency is indicated by a less lively evolution of gas from the bath, and eventually by a weakening of the case-hardening effect upon the articles to be treated; the case-hardening strength of the bath may be renewed by again suspending the basket with its cyanamid contents in the melt.

The quantity of cyanamid employed may be varied, according to the size of the bath, the shape, size and character of the articles to be case-hardened, and other conditions, as will be appreciated by those skilled in the case-hardening art. I have obtained good case-hardening results, in the treatment of articles of iron and steel, by suspending 15 pounds of calcium cyanamid in a bath containing 300 pounds of the liquid melt, *i. e.*, approximately 5% of the weight of the bath. Fresh calcium cyanamid may be added to the basket, from time to time, so as to maintain its ability to give the required case-hardening properties to the melt. It is advisable to keep the basket of calcium cyanamid in a dry place, during the interval of its periods of immersion in the bath, so that it may not become wet by attracting moisture from the atmosphere. It is also advisable to keep it dry and warm by hanging it over the bath for a short time before immersing it therein. The gas which is evolved in the liquid melt by the action of the cyanamid, and whose evolution continues even after the cyanamid has been withdrawn from the melt, probably contributes to the case-hardening properties of the bath to a considerable degree.

It will be understood, however, that I do not restrict myself to any theory concerning the mode of operation of the invention, nor to the specific details of its preferred practice as hereinbefore described, but contemplate such modifications and equivalents thereof as may fairly fall within the scope of the invention.

The basket of wire hereinbefore referred to will, of course, have wide meshes so as to permit full and free access of the liquid melt to its interior, and it will also have a like open mesh cover so as to prevent any tendency of the pieces of cyanamid to rise to the surface of the bath or to otherwise pass out of the basket.

What I claim is:

1. The method of case-hardening metals, which comprises subjecting them to the action of a liquid melt of fused salts, which liquid melt has been brought in contact with calcium cyanamid; substantially as described.

2. The method of case-hardening metals, which comprises subjectig them to the action of a liquid melt of fused salts wherein calcium cyanamid has been immersed; substantially as described.

3. The method of case-hardening metals, which comprises subjecting them to the action of a liquid melt of fused salts wherein calcium cyanamid has been immersed, the calcium cyanamid being removed from the melt as soon as a lively evolution of gas takes place therein; substantially as described.

4. The method of case-hardening metals, which comprises subjecting them to the action of a liquid melt of fused salts wherein calcium cyanamid has been immersed, the calcium cyanamid being removed from the melt as soon as the melt has acquired the desired case-hardening properties, and being re-immersed in the melt when said case-hardening properties decrease; substantially as described.

5. The method of treating objects of iron and steel consisting in immersing them in a liquid melt of fused salts which has been brought into contact with calcium cyanamid, removing them, and quenching them in a suitable cooling medium; substantially as described.

6. A bath of fused salts for case-hardening purposes into which calcium cyanamid has been immersed; substantially as described.

In testimony whereof I affix my signature.

PORTER W. SHIMER.